United States Patent
Kondo et al.

[11] Patent Number: 5,847,275
[45] Date of Patent: Dec. 8, 1998

[54] TEMPERATURE DETECTING APPARATUS AND THERMAL TYPE FLOW METER USING THE SAME

[75] Inventors: Minoru Kondo, Chiryu; Hideki Koyama, Okazaki; Tomoyuki Takiguchi, Obu, all of Japan

[73] Assignee: Nippondenso Co., Ltd., Kariya, Japan

[21] Appl. No.: 666,806

[22] Filed: Jun. 19, 1996

[30] Foreign Application Priority Data

Jun. 20, 1995 [JP] Japan ................................. 7-153488

[51] Int. Cl.[6] ............................................... G01F 1/68
[52] U.S. Cl. ............................................. 73/202.5
[58] Field of Search ....................................... 73/202.5

[56] References Cited

U.S. PATENT DOCUMENTS

| | | | |
|---|---|---|---|
| 4,561,302 | 12/1985 | Sumal et al. | 73/202.5 |
| 5,209,113 | 5/1993 | Sawada et al. | 73/202.5 |
| 5,381,691 | 1/1995 | Miyazaki et al. | 73/202.5 |
| 5,467,648 | 11/1995 | Igarashi et al. | 73/202.5 |
| 5,581,026 | 12/1996 | Sawada et al. | 73/202 |

FOREIGN PATENT DOCUMENTS

| | | |
|---|---|---|
| 6-82285 | 3/1994 | Japan . |
| 7-110251 | 4/1995 | Japan . |

*Primary Examiner*—Richard Chilcot
*Assistant Examiner*—Jewel Artis
*Attorney, Agent, or Firm*—Cushman Darby & Cushman IP Group of Pillsbury Madison & Sutro LLP

[57] ABSTRACT

A temperature detecting apparatus includes a support member made of resin and disposed in an air passage, a temperature sensor supported within the support member, and a pair of conductive members made of metal and embedded in the support member. The support member includes a surface in parallel with the intake air flow. The pair of conductive members are electrically connected to the temperature sensor. An extrusion portion is formed on the support member so as to extend along the intake air flow, and accommodates the temperature sensor at an upstream side thereof and the pair of conductive members. The conductive member includes a first extending portion extending within the extrusion portion along the air flow and a second extending portion extending from the first extending portion into the support member.

18 Claims, 3 Drawing Sheets

TEMPERATURE DETECTING APPARATUS AND THERMAL TYPE FLOW METER USING THE SAME

CROSS REFERENCE TO RELATED APPLICATION

This application is based on and claims priority from Japanese Patent Application No. 7-153488 filed on Jun. 20, 1995, the contents of which are incorporated herein by reference.

BACKGROUND OF THE INVENTION

1. Field of the Invention

The present invention relates to a temperature detecting apparatus and a thermal type flow meter using the same, and specifically to an installation structure of a temperature sensor in the thermal type flow meter.

2. Description of the Related Art

Conventionally, a thermal type flow meter mounted on a vehicle for measuring an amount of intake air into an engine, is known in a thermal type flow meter having a function portion, into which an electronic circuit portion and a sensor portion are integrally incorporated, within a flow passage of the thermal flow meter, the influence of eccentricity and turbulence of the air flow at an upstream side is reduced by improving the installation efficiency in the engine, accompanied by the downsized body. For decreasing the weight, the functional portion is disposed in a resin-formed case member. Further an intake air temperature sensor for sensing the temperature of the intake air passing through the fluid passage is integrally formed with the case member, thereby improving assembling performance of the intake air temperature sensor.

However, according to such thermal type flow meter, since the intake air temperature sensor for sensing the temperature of the suction air passing through the fluid passage is provided at a position close to an electronic circuit accommodated in the case member, the intake air temperature sensor is heated by the heat generated by the electronic circuit, causing an error in an indicated value of the intake air temperature sensor. For this reason, a method of providing the intake air temperature sensor at a position away from an electronic circuit has been proposed.

However, according to the method of providing the intake air temperature sensor away from the electronic circuit, since the casing member accommodating the functional parts is integrally formed with the intake air temperature sensor accommodating the temperature sensor element, it may be difficult to release the casing member with the intake air temperature sensor from the die unit depending on the position of the intake air temperature sensor when the casing member is molded. As a result, the die unit for forming the case member is complicated, the number of separate dies is increased, and the cost of manufacturing the thermal flow meter is increased.

SUMMARY OF THE INVENTION

It is, therefore, an object of the present invention to provide a temperature detecting apparatus capable of reducing an error in an indicated value and also reducing the manufacturing cost by improving the installation efficiency and a thermal type flow meter using the same.

According to the present invention, a temperature detecting apparatus includes a support member made of resin and disposed in an air passage, a temperature sensor supported within the support member, and a pair of conductive members made of metal and embedded in the support member. The support member includes a surface in parallel with the intake air flow. The pair of conductive members are electrically connected to the temperature sensor. An extrusion portion is formed on the support member so as to extend along the intake air flow, and accommodates the temperature sensor at an upstream side thereof and the pair of conductive members. The conductive member includes a first extending portion extending within the extrusion portion along the air flow and a second extending portion extending from the first extending portion into the support member.

According to this structure, since the temperature sensor is disposed in the extrusion portion at the upstream side and the intake air is introduced from the side of the temperature sensor, the heat conducted through the support member is suppressed from being transmitted to the temperature sensor, thereby reducing the error in the indicated value of the temperature sensor caused by the heat conducted through the support body., When the temperature sensor is exposed in the air passage and disposed at the upstream side of a heating source such as an electronic circuit, the heat capacity of the temperature sensor element can be reduced and the heat conducted from the heating source to the temperature sensor can be transmitted to the air, thereby reducing the error in the indicated value of the temperature sensor due to the heat conducted from the heating body to the temperature sensor. In addition, since a simple structure in which the temperature sensor element is disposed at the upstream side of the heating source is employed, the structure of the die units can be simplified, even if the temperature sensor is integrally molded with the support member, for example. Accordingly, an increase in the number of the separate dies and the difficulty in releasing the support member can be prevented, and the manufacturing cost can be reduced.

When an air clearance is formed between the temperature sensor and the heating source, the heat conducted from the heating source is prevented from being transmitted to the temperature sensor element. That is, since the heat conducted from the heating source is not easily transmitted to the temperature sensor element of the temperature sensor, the air clearance has the effect of reducing the error in the indicated value of the temperature sensor due to the heat conducted from the heating source to the temperature sensor element. Further, since the heat insulation structure which fixes the temperature sensor to the support member includes an air clearance between the temperature sensor and the heating source, the simple structure can be obtained even if the heat insulation structure is integrally formed with the support member, for example. For this reason, an increase in the number of separate dies and the difficulty in releasing the support member with the temperature sensor can be prevented, and the manufacturing cost can be reduced.

When the air clearance is formed between the support member and the temperature sensor, heat conduction between the heating body and the temperature sensor is prevented. This clearance can reduce the contact area between the heating source and the support member. In this way, the heat is prevented from being conducted from the heating source to the temperature sensor fixed to the support member, because the clearance interrupts the conducting of the heat generated by the heating source to the support member. Consequently, the error in the indicated value of the temperature sensor due to the heat conducted by the heating body is reduced. In addition, since the heat insulation structure is formed by the air clearance between the support member for supporting the heating source and the heating body, the clearance can be easily formed by forming a plurality of protrusions between the support member and the heating source, for example. Accordingly, since the die units can be simplified in structure, even if plural protrusions are integrally formed with the support member, an increase in the number of the separate dies for forming the clearance and the difficulty in releasing the support member can be prevented, and the manufacturing cost can be reduced.

Further, when the above temperature detecting apparatus is applied to a thermal type flow meter, the intake air temperature sensor fixed in the thermal type flow meter reduces the error in the indicated value due to the heat generated by the heating source. For this reason, the intake air temperature sensor can accurately sense the temperature of the fluid passing through the main passage, and an electric control unit or the like, for example, can accurately control the ignition timing control of an engine or the like based on the detected data obtained from the output of the intake air temperature sensor.

BRIEF DESCRIPTION OF THE DRAWINGS

Other objects, features and characteristics of the present invention will be appreciated from a study of the following detailed description, the appended claims, and drawings, all of which form a part of this application. In the drawings:

DETAILED DESCRIPTION OF THE PREFERRED EMBODIMENTS

Referring to the accompanying drawings, various embodiments of the present invention are described below.

A first embodiment of the present invention is described.

Figure 1:
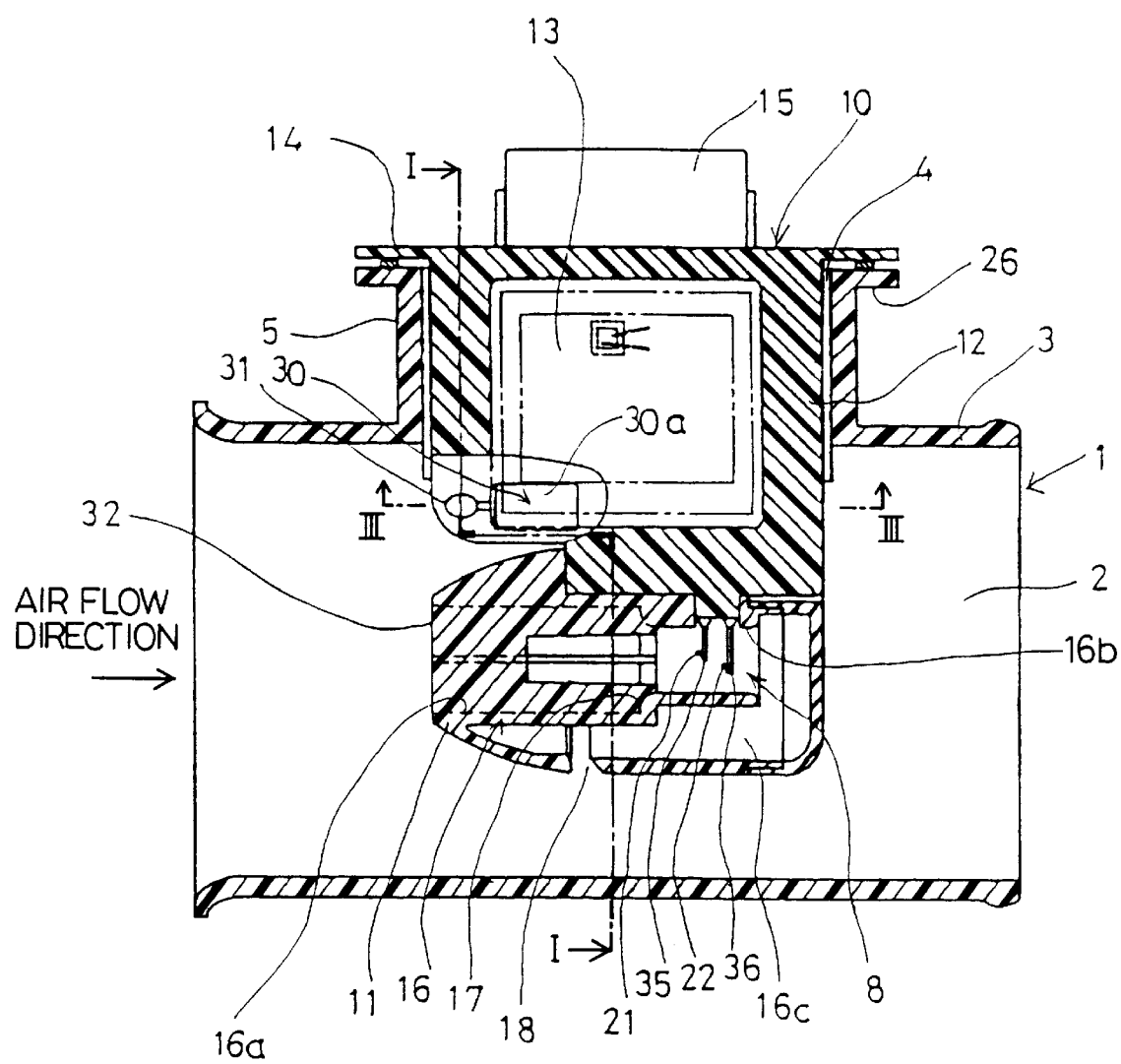
FIG. 1 is a cross-sectional view showing a thermal type flow meter of a first embodiment according to the present invention.
Figure 2:
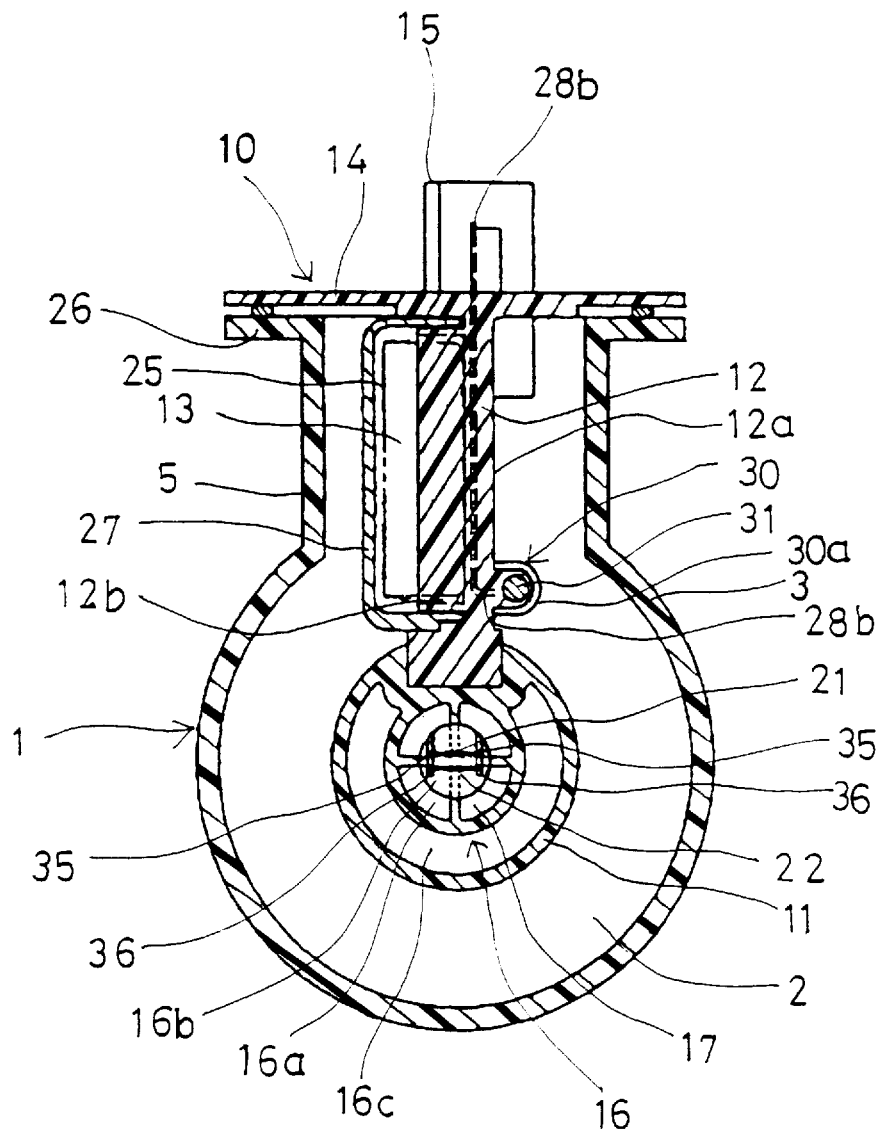
FIG. 2 is a cross-sectional view taken along the line II—II in FIG. 1.

In the first embodiment, a thermal type flow meter measures an amount of intake air into an engine and is provided in a duct having an intake air passage formed at the downstream side of an air cleaner element. As shown in FIGS. 1 and 2, a sensor unit 10, which constitutes a main part of the thermal type flow meter, is installed on a duct 1.

Duct 1 includes a first cylindrical body 3 having a main passage 2 as a fluid passage and a second cylindrical body 5 having a hole 4 for inserting sensor unit 1. These first cylindrical body 3 and second cylindrical body 5 are integrally molded with resin.

Sensor unit 10 is fixedly assembled in second cylindrical body 5. Sensor unit 10 constitutes a major part of the thermal type flow meter and includes a central member 11 located at the center of main passage 2 in an assembled state, a flow detecting portion 8 to measure air flow rate, a rib 12 supporting central member 11 in main passage 2, a circuit casing 25 made of metal fixed to rib 12 and accommodating an electronic circuit 13 (which is later described), an electronic circuit 13 fixed to rib 12 and controlling and processing signals from the flow detecting portion 8, an installation portion 14 to secure sensor unit 10 on duct 1, an intake air temperature sensor 30 fixed to rib 12 and sensing the temperature of the intake air passing through main passage 2, and a mechanical connector portion 15 to electrically connect electronic circuit 13 with intake air temperature sensor 30.

Central member 11 is formed in a shell shape, in which its outside diameter gradually increases toward the downstream direction. Central member 11 is provided at the central part in first cylindrical body 3 in such a manner that the cross-section of main passage 2 formed around the periphery of central member 11 is reduced. A bypass passage 16 formed in central member 11 includes a large diameter passage 16a at an upstream side, a small diameter passage 16b at a downstream side, and a step portion 17 between large diameter passage 16a and small diameter passage 16b. Area of the downstream bypass passage formed by small diameter passage 16b is smaller than that of the upstream bypass passage formed by large diameter passage 16a at the upstream side of step portion 17. Bypass passage 16 turns around at the downstream side of flow detecting section 8, and a bypass passage 16c having a C-shaped cross section, which turns around and returns to the upstream side, forms a bypass outlet portion 18 around the outer periphery of central member 11 at the upstream side of flow detecting portion 8. Bypass passage 16 is connected to main passage 1 at bypass outlet portion 18. Bypass outlet portion 18 opens, as shown in FIG. 2, over nearly the entire periphery of bypass passage 16c excluding the portion where rib 12 is formed.

Flow detecting portion 8 includes a flow measuring resistor 21 and a temperature compensating resistor 22, and these resistors 21 and 22 are disposed in small passage 16b and supported by support members 35 and 36 perpendicularly with respect to the flow direction of small diameter passage 16b.

Rib 12 as a supporting member supports central member 11 such that central member 11 is disposed approximately at the center of main passage 2. Rib 12 is inserted in hole 4 of second cylindrical body 5 in an opening direction thereof.

Installation portion 14 secures central member 11, rib 12, electronic circuit casing 25 and connecter portion 15 to duct 1, and is secured to a flange 26 of second cylindrical body 5 of duct 1. It means that, by simply securing installation portion 14 of sensor unit 10 to second cylindrical body 5, central member 11 supported on installation portion 14 by rib 12 can be disposed approximately at the center of main passage 2. That is, by inserting and assembling sensor unit 10 in the opening of second cylindrical body 5 formed on duct 1, flow detecting portion 8 of the thermal type flow meter can be assembled and disposed.

Figure 3:
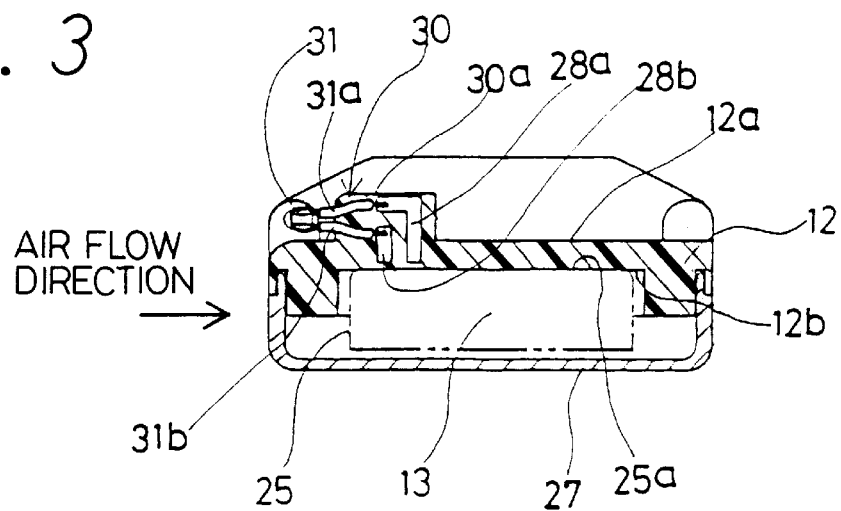
FIG. 3 is a cross-sectional view taken along the line III—III in FIG. 1.

Electronic circuit 13 as a heating body includes a control electronic circuit (not shown) electrically connected to flow measuring resistor 21 and temperature compensating resistor 22, and the control electronic circuit is accommodated in electronic circuit case 25. In addition, as shown in FIGS. 2 and 3, electronic circuit case 25 is secured to a concave portion 12b formed in rib 12 by adhesive or the like, and its periphery is covered with a cover 27. Accordingly, an installation surface 25a of electronic circuit case 25 closely contacts with concave portion 12b.

The control circuit includes a plurality of active electronic parts such as semiconductor (not shown) and a plurality of passive electronic parts of resistance, capacitor, or the like (not shown), which are driven by the power source voltage supplied from a connector (which will be described later). Therefore, when the control circuit is operated, electronic circuit 13 generates heat according to the structure of the control circuit by the conversion from electrical energy generated from each of the electronic parts to thermal energy. A considerable amount of the heat is released from electronic circuit case 25 toward the outside. Accordingly, the heat released from electronic circuit casing 25 is conducted to rib 12, cover 27 or the like and transmitted to the intake air passing through main passage 2.

On the side surface at the back side of electronic circuit case 25 of rib 12 is provided an intake air temperature sensor 30 integrally formed with rib 12. Intake air temperature sensor 30 is placed so as to be exposed to the air in main passage 2 when installed. Intake air temperature sensor 30 includes a temperature sensor element 31 therein, and further, as shown in FIG. 3, lead wires 31a and 31b of temperature sensor element 31 are electrically connected to band terminals 28a and 28b formed inserting to rib 12.

Connector portion 15 secures terminals (not shown), which are electrically connected to electronic circuit 13, and terminals 28a and 28b, which are electrically connected to a temperature sensor element 31. Connector portion 15 is integrally molded with installation portion 14 with resin.

Next, an installation structure of intake air temperature sensor 30 is described in detail with reference to FIGS. 2 and 3.

As shown in FIG. 2, intake air temperature sensor 30 as a temperature sensing portion is disposed in main passage 2 so that intake air temperature sensor 30 is exposed to the air passing through main passage 2. Intake air temperature sensor 30 senses the temperature of the air flow in main passage 2 accurately and transmits the heat released from electronic circuit case 25 located at the back side of intake air temperature sensor 30 to the intake air. For those purposes, as shown in FIG. 3, temperature sensor element 31 of intake air temperature sensor 30 is exposed in main passage 2 so as to face toward the upstream side of the intake air without its periphery being covered with sensor housing 30a integrally formed with rib 12. Accordingly, by exposing temperature sensor element 31 in main passage 2 in this way, temperature sensor element 31 can be easily cooled by the intake air flowing in main passage 2.

As can be understood from FIG. 3, since temperature sensor element 31 is located at the intake air upstream side of electronic circuit casing 25 of electronic circuit 13, the intake air heated by the heat generated from electronic circuit 13 is hardly transmitted to temperature sensor element 31. Therefore, although the heat generated from electronic circuit 13 is conducted to temperature sensor element 31 from lead wires 31a and 31b of temperature sensor 30 via electronic circuit casing 25, rib 12 and sensor housing 30a, since the intake air is introduced from the tip end portion of the temperature sensor element, the temperature sensor can be radiated more by means of the intake air. That is, as the heat conducted from one side of lead wires 31a and 31b of temperature sensor element 31 is transmitted to the intake air which flows towards the other side of lead wires 31a and 31b of temperature sensor element 31, the heat conducted from lead wires 31a and 31b of temperature sensor element 31 can be released in the intake air. According to such a heat radiation structure, by installing intake air temperature sensor 30 to rib 12, the increase in the temperature of temperature sensor element 31 due to the heat generated by the control circuit can be suppressed, the error in the indicated value of the temperature sensor element is reduced, and the intake air temperature can be measured with high accuracy.

Further, since intake air temperature sensor 30 is formed in a convex shape toward the outside from sidewall 12a at a back side of concave portion 12b of rib 12, even when rib 12 and intake air temperature sensor 30 are integrally molded, a complicated die unit for forming is not needed. Accordingly, it is easy to release the rib 12 when forming the rib 12, and the manufacturing cost can be reduced since the number of separate dies is reduced.

Next, an operation of the first embodiment according to the present invention is now be described.

In FIG. 1, the air introduced through an air cleaner (not shown), which is assembled at the upstream side of duct 1, is introduced into main passage 2 and flows from left to right in main passage 2 in FIG. 1. In this case, since the area of the main passage is throttled by central member 11, flow rate of the air flowing in main passage 2 increases, a negative pressure is generated at bypass outlet portion 18, and according to the differential pressure between the negative pressure and the pressure at bypass inlet portion 32 of bypass passage 16, the air flow is generated in bypass passage 16. Flow measuring resistor 21 disposed in bypass passage 16 is heated by electronic circuit 13 to certain differential temperature relative to intake air temperature and measures the air flow in bypass passage 16. In this way, the flow rate of the intake air can be detected.

Further, the intake air introduced into main passage 2 reaches temperature sensor element 31 in the direction of the tip end portion of temperature sensor element 31 before the intake air is heated by the heat generated from electronic circuit case 25 of electronic circuit 13. Therefore, the heat generated from electronic circuit 13 is radiated, and the intake air temperature in main passage 2 can be sensed and measured with high accuracy.

Since bypass inlet portion 32 for forming bypass passage 16 is positioned approximately at the center of main passage 2, turbulence of air flowing through bypass passage 16 is smaller than with turbulence of the air flow from the upstream side. Since step portion 17 is formed at the upstream side of flow detecting portion 8 in bypass passage 16, air flow from the upstream side is smoothed by being throttled at step portion 17. In addition, since bypass outlet portion 18 opens approximately in a C-shape over nearly the entire periphery of bypass passage 16 except for rib 12 against an eccentric air flow from the upstream side, and further, the outer diameter of central member 11 gradually spreads out toward the downstream side so as to have a function for recovering the eccentric air flow, the flow rate in bypass passage 16 is leveled off and is hardly influenced by the eccentric air flow from the upstream side.

Figure 4:
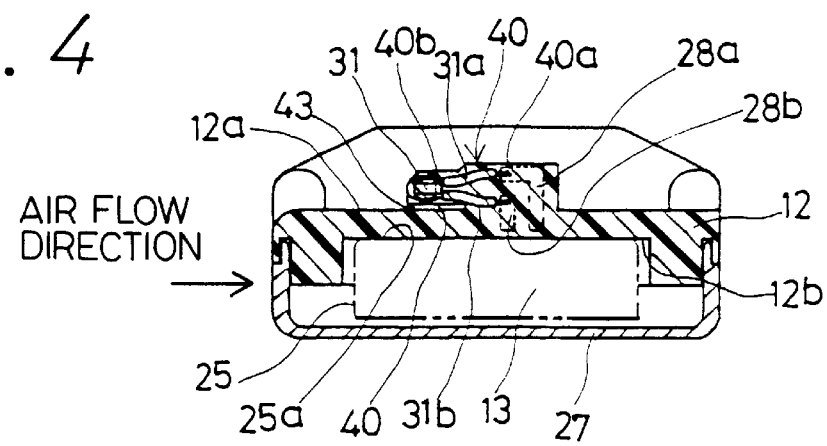
FIG. 4 is a cross-sectional view showing a main portion of a thermal type flow meter of a second embodiment according to the present invention.

A second embodiment according to the present invention will now be described with reference to FIG. 4. In FIG. 4, parts or components substantially identical to those as in the first embodiment are shown with the same reference numerals.

According to the second embodiment as shown in FIG. 4, temperature sensor element 31 includes an intake air temperature sensor 40 covered with a sensor housing 40a, and a slit 43 is formed between a sensor housing head 40b for covering the periphery of temperature sensor element 31 and rib 12.

Intake air temperature sensor 40 is provided at a downstream side of the intake air as compared with the intake air temperature sensor 30 of the first embodiment. As shown in FIG. 4, intake air temperature sensor 40 is positioned approximately at the center of the back side of electronic circuit 13. In addition, since a periphery of temperature sensor element 31 of intake air temperature sensor 40 is covered with sensor housing head 40b, temperature sensor element 31 is not exposed in main passage 2 unlike temperature sensor element 31 of the first embodiment.

However, since slit 43 is formed between a side wall 12a of rib 12, which is integrally molded with sensor housing 40a, and sensor housing head 40b, the heat generated from electronic circuit 13 is hardly conducted directly to sensor housing head 40b via rib 12. In this way, the heat generated from the control circuit of electronic circuit 13 (not shown) is conducted to temperature sensor element through electronic circuit casing 25, rib 12, sensor housing 40a, sensor housing head 40b and lead wire 31a. Further, since slit 43 is formed between sidewall 12a of rib 12 and sensor housing head 40b, the surface area of sensor housing head 40b for covering the periphery of temperature sensor element 31 can be increased. According to such a head insulating structure, by installing intake air temperature sensor 40 in rib 12, the surface area of sensor housing head 40b imposed in main passage 2 is increased, and therefore, the increase in temperature of temperature sensor element due to the generation of heat is suppressed, thereby obtaining an effect of measuring the temperature of the intake air precisely in the same manner as the first embodiment.

Further, since intake air temperature sensor 40 is formed in a convex shape toward the outer direction from sidewall 12a at a back side of concave portion 12b of rib 12, even when rib 12 and intake air temperature sensor 30 are integrally molded, a complicated die unit for forming is not needed. Accordingly, it is easy to release the rib 12 when forming the rib 12, and the manufacturing cost can be reduced since the number of separate dies is reduced.

Still further, since the periphery of temperature sensor element 31 is covered with sensor housing head 40b, temperature sensor element 31 is hardly exposed to the intake air flowing into main passage 2. Accordingly, although any extraneous materials or the like are mixed into the intake air, temperature sensor element 31 is hardly damaged by such extraneous materials, thereby protecting temperature sensor element 31 from the extraneous material or the like.

A third embodiment according to the present invention is described with reference to FIG. 5. In FIG. 4, parts or components substantially identical to those as in the first embodiment are shown with the same reference numerals.

Figure 5:
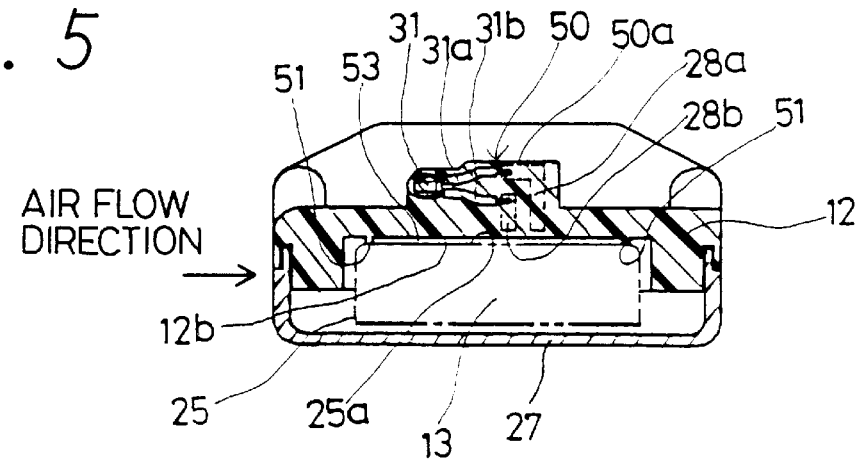
FIG. 5 is a cross-sectional view showing a main portion of a thermal type flow meter of a third embodiment according to the present invention.

According to the third embodiment as shown in FIG. 5, a clearance 53 is formed between rib 12 and electronic circuit casing 25 by providing a protrusion portion between rib 12 and electronic circuit casing 25 of electronic circuit 13.

Concave portion 12b is formed in rib 12 for receiving electronic circuit casing 25 of electronic circuit 13. In the first and second embodiments, installation surface 25a of electronic circuit casing 25 closely contacts with the bottom portion of the concave portion 12b by adhesives or the like, however, in the third embodiment, installation surface 25a of electronic circuit casing 25 is prevented from being adhered to the bottom portion of concave portion 12b by providing protrusion portions 51 on concave portion 12b so that clearance 53 is formed between electronic circuit casing 25 and the bottom of rib 12.

Plural protrusion portions 51 are formed on the bottom of concave portion 12b in such a manner that each protrusion portion is placed at an interval slightly narrower than the width of installation surface 25a of electronic circuit casing 25, for example. By placing the plural protrusion portions 51 at the interval narrower than the width of installation surface 25a of electronic circuit casing 25, installation surface 25a of electronic circuit casing 25 is prevented from being adhered to the bottom portion of concave portion 12b, and the contacting area of electronic circuit casing 25 and rib 12 is reduced when fixing electronic circuit casing 25 in reversed concave portion 12b via the plural protrusion portions 51. Further, as clearance 53 is formed between electronic circuit casing 25 and rib 12, the heat generated from the control circuit in electronic circuit casing 25 is prevented by clearance 53 from being conducted directly to rib 12. The heat is allowed to be conducted to rib 12 via plural protrusion portions 51. Accordingly, the heat transmission to rib 12 by the generation of heat at the control circuit is reduced, thereby suppressing the heat conduction to an intake air sensor 50 located at the back side of electronic circuit casing 25 via rib 12.

In intake air sensor 50, a sensor housing 50a is integrally formed with rib 12 so as to cover temperature sensor element 31 and lead wires 31a and 31b. While rib 12 is adhered to temperature sensor element 31 via resin material, the heat generated by the control circuit is suppressed from being conducted to intake air temperature sensor 50 since clearance 53 is formed between electronic circuit casing 25 of the heating electronic circuit 13 and rib 12. By employing such a structure, the increase in temperature of temperature sensor element 31 due to the heat generated by the control circuit is suppressed, thereby allowing the intake air temperature to be measured accurately.

Further, since intake air temperature sensor 50 is formed in a convex shape toward the outer direction from sidewall 12a at a back side of concave portion 12b of rib 12, even when rib 12 and intake air temperature sensor 30 are integrally molded, a complicated die unit for forming is not needed, and the plural protrusion portions 51 on rib 12 can be formed in a convex shape without using a complicated die unit. Accordingly, in the same manner as the first embodiment, it is easy to release the rib 12 when forming the rib 12, and the manufacturing cost can be reduced since the number of separate dies is reduced.

According to the third embodiment, in which protrusion portions 51 are provided at rib 12 and clearance 53 is formed, a plate-like heat insulating material or the like, for example, may be inserted between electronic circuit case 25 and rib 12 instead of protrusion portions 51. In this way, the same effect as clearance 53 can be obtained by the heat insulating material.

It should be noted that the thermal type flow meter according to the present invention is not limited to flow meters for measuring the intake air flow in an engine, but also can be applied to other fluid measuring devices.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined in the appended claims.

What is claimed is:

1. A temperature detecting apparatus disposed in an air passage through which intake air flows to an internal combustion engine, comprising:

a support member made of resin and disposed in said air passage, said support member defining a surface in parallel with said intake air flow;

a temperature sensor supported within said support member;

a pair of conductive members made of metal and embedded in said support member, said pair of conductive members being electrically connected to said temperature sensor; and an extrusion portion formed on said support member so as to extend along said intake air flow, for accommodating said temperature sensor at an upstream side thereof and said pair of conductive members;

wherein said conductive member includes a first extending portion extending within said extrusion portion along said air flow and a second extending portion extending from said first extending portion into said support member.

2. A temperature detecting apparatus according to claim 1, further comprising:

a heating source accommodated within said support member for generating heat.

3. A temperature detecting apparatus according to claim 2, wherein said temperature sensor is disposed at an upstream side of an upstream end of said heating source.

4. A temperature detecting apparatus according to claim 2, wherein a thin-layered air clearance is formed on the shortest way between said temperature sensor and said heating source.

5. A temperature detecting apparatus according to claim 4, wherein said air clearance is formed between said surface of said support member and said temperature sensor.

6. A temperature detecting apparatus according to claim 4, wherein said air clearance is formed between said surface of said support member and said heating source.

7. A temperature detecting apparatus according to claim 2, wherein said heating source is an electronic circuit including an electric element which generates heat when electric current is supplied thereto.

8. A temperature detecting apparatus according to claim 7, wherein said support member forms a bypass passage for separating a part of said intake air from said air passage, said bypass passage having an outlet connected to said air passage, and said temperature sensor is disposed at an upstream side of said outlet of said bypass passage.

9. A temperature detecting apparatus according to claim 8, wherein said support member is disposed in said bypass passage so as to support a resistor which generates heat when electric current is supplied thereto.

10. A temperature detecting apparatus according to claim 9, wherein said support member includes:

an installation portion which is adopted to be installed in a duct for forming said air passage to said internal combustion engine; and a rib extending from said installation portion into said air passage, said rib being formed in a plate spreading along the flow direction of said intake air, said extrusion portion being formed on said rib.

11. A temperature detecting apparatus according to claim 10, wherein said support member includes a bypass passage forming member for defining said bypass passage, and said bypass passage forming member is supported by said rib.

12. A temperature detecting apparatus according to claim 11, further comprising:

a duct for defining said air passage to said internal combustion engine.

13. A thermal type flow meter for metering an amount of fluid, comprising:

a duct for defining a main fluid passage through which said fluid flows;

a support member made of resin and disposed in said main fluid passage, said support member defining a surface in parallel with a flow of said fluid;

a temperature sensor supported within said support member and disposed in said main fluid passage, for detecting a temperature of said fluid flowing in said main fluid passage;

a pair of conductive members made of metal and embedded in said support member, said pair of conductive members being electrically connected to said temperature sensor;

means for forming a bypass passage for separating a part of said fluid from said main fluid passage;

a fluid flow detecting unit disposed in said bypass passage, said fluid flow detecting unit comprising:

a heating element for generating heat to be cooled by said fluid flowing in said bypass passage, and a temperature compensating element for detecting a temperature of said fluid flowing in said bypass passage to control an amount of heat generated by said heat generating element:

an electronic circuit supported within said support member, said electronic circuit including an electric element which generates heat when electric current is supplied thereto;

an extrusion portion formed on said support member so as to extend along said flow of said fluid, said extrusion portion accommodating said temperature sensor and said pair of conductive members;

wherein one of said conductive members includes a first extending portion extending within said extrusion portion along said flow of said fluid and a second extending portion extending from said first extending portion into said support member.

14. A thermal type flow meter according to claim 13, wherein:

said support member forms said bypass passage having an outlet communicating with said main fluid passage, and said temperature sensor is disposed at an upstream side of said outlet.

15. A thermal type flow meter according to claim 13, wherein an air clearance is formed between said surface of said support member and said temperature sensor.

16. A thermal type flow meter according to claim 13, wherein an air clearance is formed between said surface of said support member and said electronic circuit.

17. A thermal type flow meter for metering an amount of fluid, comprising:

a duct for defining a main fluid passage through which said fluid flows;

a support member made of resin and disposed in said main fluid passage, said support member defining a surface in parallel with a flow of said fluid, said support member forms a bypass passage for separating a part of said fluid from said main fluid passage;

a temperature sensor supported within said support member and disposed in said main fluid passage, for detecting a temperature of said main fluid passage;

a pair of conductive members made of metal and embedded in said support member, said pair of conductive members being electrically connected to said temperature sensor;

an electronic circuit supported within said support member, said electronic circuit including an electric element which generates heat when electric current is supplied thereto; and an extrusion portion formed on said support member so as to extend along said flow of said fluid, said extrusion portion accommodating said temperature sensor and said pair of conductive members.

18. A thermal type flow meter according to claim 17, wherein one of said conductive members includes a first extending portion extending within said extrusion portion along said flow of said fluid and a second extending portion extending from said first extending portion into said support member.

* * * * *